E. WÉRY.
HYDRAULIC AND SPRING SHOCK ABSORBER FOR AUTOMOBILES.
APPLICATION FILED JAN. 26, 1915.
1,289,583.
Patented Dec. 31, 1918.
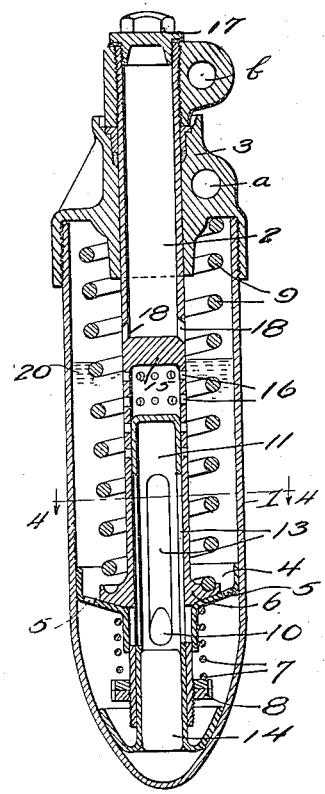
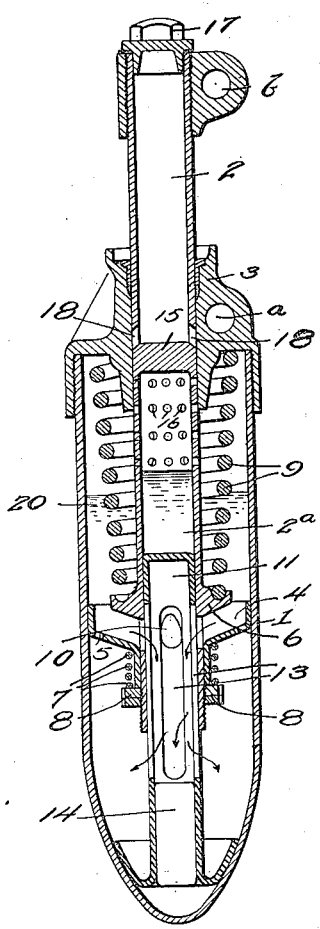
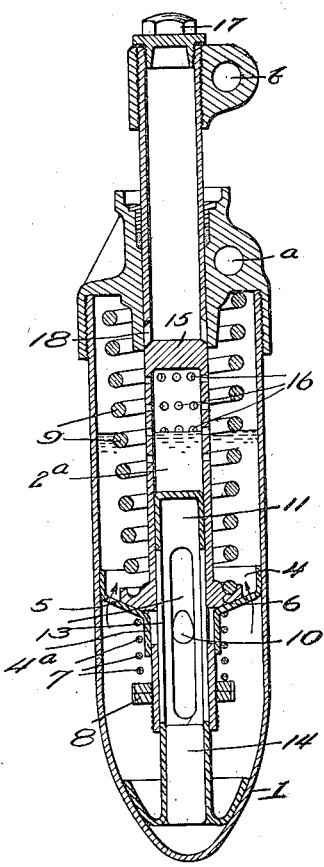
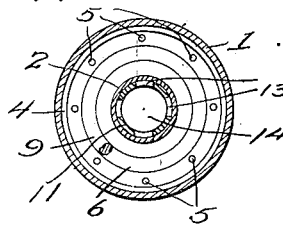
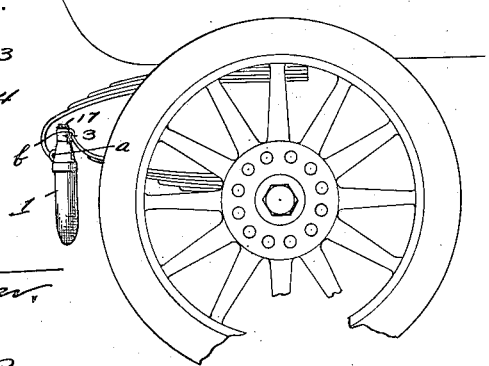
Inventor
E. Wéry.

UNITED STATES PATENT OFFICE.

EMILE WÉRY, OF LIEGE, BELGIUM, ASSIGNOR TO EUGENE C. BROWN, OF WASHINGTON, DISTRICT OF COLUMBIA.

HYDRAULIC AND SPRING SHOCK-ABSORBER FOR AUTOMOBILES.

1,289,583.

Specification of Letters Patent.

Patented Dec. 31, 1918.

Application filed January 26, 1915. Serial No. 4,565.

*To all whom it may concern:*

Be it known that I, EMILE WÉRY, a citizen of Belgium, and a subject of the King of Belgium, residing at Liege, in Belgium, have invented certain new and useful Improvements in Hydraulic and Spring Shock-Absorbers for Automobiles, of which the following is a specification.

This invention relates to improvements in shock absorbers for vehicles which may be conveniently interposed between the parts of the main vehicle springs for the purpose of absorbing all the slight jars and shocks which would otherwise be transferred directly to the body of the vehicle, since the usual springs are too stiff to act under such light loads.

One of the objects of my invention is to provide a shock absorber in which the shocks transmitted to a plunger movable within a casing are absorbed by spiral springs and the recoil is checked by oil or other fluid which is forced through restricted passages.

Another object is to provide automatic means for graduating the orifices or channels traversed by the fluid in proportion to the suddenness and violence of the shock or the respective shocks in a series of rapidly succeeding shocks so that the efforts of the spring may be equalized.

Other objects of my invention will appear from the following description in connection with the accompanying drawings in which—Figure 1 is a vertical section of a shock absorber embodying my invention. In this figure the shock absorber is in the condition of rest. Fig. 2 shows the apparatus during the compression of the principal spring. Fig. 3 shows the shock absorber during the period of expansion of the spring and of the checking or braking action of the liquid. Fig. 4 shows a section through Fig. 1 on the line 4—4; and Fig. 5 is a partial side elevation of a vehicle showing one manner of attaching my shock absorber.

A cylindrical casing 1 is provided with a hole $a$ to receive a bolt of one of the vehicle springs. A hollow controlling piston rod 2, of large diameter is attached at $b$ to the vehicle spring, a cover or closure cap 3 serving to guide the rod 2.

The main controlling piston rod 2 is provided with a shoulder or flange 6, to receive the lower end of the main cushioning spring 9, and carries upon its lower end a piston 4, which is slidable thereon through a limited range of movement, being normally held against the lower side of the flange or abutment 6, by a weak spring 7, the tension of which may be adjusted by means of the nuts 8, threaded on the end of the rod 2. The piston is provided with a depending tubular flange $4^a$, which in the normal position, covers a series of openings 10, of graduated section, in the hollow rod 2.

A hollow plunger 11 secured rigidly to the bottom of the casing 1 telescopes into the bore of the hollow piston rod 2. This hollow central plunger 11 is provided with long slots 13 which are opposite the openings 10 of the rod 2, their length corresponding to the maximum path traveled by the piston 4 in the casing 1. The lower part of the plunger 11 is closed by a plug 14. The hollow rod 2 is provided with a partition at 15 and is pierced therebelow with small holes 16 to permit the passage of the liquid 20 into the chamber $2^a$, when in the position shown in Fig. 1. The casing 1 may be filled with oil or other liquid to the desired amount by removing the cap nut 17, the liquid passing into the casing through the holes 18.

In the position of rest shown in Fig. 1, the casing is about two-thirds filled with oil, the spring 9 is partially expanded, and the main piston 4 is located near the bottom of the casing, being forced against the shoulder 6 on the piston rod 2 by the weak spring 7.

During the period of compression of the main spring 9, as illustrated in Fig. 2, the liquid 20 in the casing 1, forces the piston 4 downwardly away from the flange 6, thereby compressing the weak spring 7. In its downward movement the piston 4 exposes the openings 10 which preferably have a graduated section as illustrated. The liquid may then pass into the hollow plunger 11 through the openings 10 and slots 13 and outwardly into the lower part of the casing, following the direction of the arrows. During this period the lower part of the central plunger 11 below the piston 4, is filled with the liquid which passes through the openings 10 and slots 13. In consequence of the graduated shape given to the openings 10, it will be noted that the amount of liquid passing therethrough will be in proportion to the degree of pressure of the liquid on the piston 4. It will be noted that this arrangement allows a sufficient amount of the oil to pass through to equalize the work demanded of the main spring 9 during a succession of shocks. The piston 4 is very light and may be made of aluminum or other sheet metal in order that it may be moved by a slight pressure and thus respond quickly. During the succeeding recoil or expansion of the main spring 9, as illustrated in Fig. 3, the piston 4 is forced upwardly against the shoulder 6 on the piston rod 2 by the action of the liquid and by the spring 7. The central tubular part 4ª of the piston then completely covers the graduated openings 10. The slots 13 being inclosed by the hollow piston rod, the liquid is hence forced to pass through the small holes 5 provided in the periphery of the piston 4 as shown by the arrows in Fig. 3, thus producing a resistance to the passage of the liquid, which will be sufficient for the retarding or braking effect to check the recoil of the spring. A second braking or retarding effect is obtained by the action of the plunger 11 upon the oil in the chamber 2ª, which has been filled through the openings 16 when the parts were in normal position shown in Fig. 1. This second cushioning effect produced by the action of the plunger 11 in expelling the air and liquid from the small chamber 2ª through the small openings 16, coöperates with the cushioning effect produced by the liquid upon the lower side of the piston 4 which can only pass by way of the small peripheral holes 5, and distributes the resisting efforts in different parts of the casing and the strains upon different parts of the piston rod. Spiral springs furnish nearly as much energy in recoil as is communicated to them, but the hydro-pneumatic action described perfectly absorbs the rebound shock which would occur if no provision were made to cushion the return expansion or reaction of the springs in the fluid.

My spring shock absorbing medium and combined hydro-pneumatic cushioning or retarding medium constitute an exceedingly effective apparatus for practically nullifying the jars due to unevenness and obstructions in the roadway and effectually prevent any injurious or unpleasant vibrations from being transmitted to the body of the vehicle. The automatic control of the degree of opening of the graduated apertures 10, by the independent movement of the piston 4, depending upon the suddenness and violence or amplitude of the movement produced upon the wheels by the obstruction or irregularity of the roadway, affords great flexibility in the operation of the shock absorber. The adjusting and locking nuts 8, afford a means of manually varying the normal tension of the spring 7 and constitute a means for varying and determining the sensitiveness of the piston 4 to a movement along the piston rod 2, for the purpose of uncovering the openings 10.

While I have described in detail the construction illustrated in the accompanying drawings for the purpose of clearly disclosing an embodiment of my invention, I am aware that various modifications and changes may be made within the scope of my claims and without in any manner departing from the spirit of my invention. Thus I may place a valve for the entrance of air near the top of the hollow piston rod, thereby permitting the central hydro-pneumatic braking action to be changed to a pneumatic braking action; and I may also eliminate the central plunger 11 and depend upon the cushioning effect of the liquid upon the piston 4. It is evident that my shock absorber may be constructed singly as illustrated or in the twin form with a pair of these devices arranged side by side to be coupled to each vehicle spring.

I claim:—

1. A shock absorber, comprising a casing adapted to contain a fluid, a piston rod reciprocable therein, a piston mounted upon said rod and longitudinally slidable thereon through a restricted range of movement, said rod having a channel adapted to form a passage for the fluid from one side to the other of the piston, yieldable means for positioning said piston to normally close said channel, and an elastic medium adapted to receive outward thrusts or movements of the piston rod.

2. A shock absorber, comprising a casing adapted to contain a fluid, a piston rod reciprocable therein, a piston mounted upon said rod and longitudinally slidable thereon through a restricted range of movement, said rod having a channel adapted to form a passage for the fluid from one side to the other of the piston, a spring normally holding said piston in position to close said channel, and a spring having opposite ends engaging said piston rod and a wall of said casing respectively to thereby receive the shocks or movements tending to separate said piston rod and said casing.

3. A shock absorber comprising a casing provided with a closure cap and adapted to contain a fluid, a piston rod reciprocable therein and passing through an opening in said cap, an abutment or flange on said piston rod, a spring bearing at opposite ends upon said abutment and said cap, and a piston carried by said rod and having a limited movement longitudinally thereof.

4. A shock absorber comprising a casing provided with a closure cap and adapted to contain a fluid, a piston rod reciprocable therein and passing through an opening in said cap, an abutment or flange on said piston rod, a spring bearing at opposite ends upon said abutment and said cap, a piston carried by said rod and having a limited movement longitudinally thereof, and a spring normally holding said piston against said abutment.

5. A shock absorber comprising a casing provided with a closure cap and adapted to contain a fluid, a piston rod reciprocable therein and passing through an opening in said cap, an abutment or flange on said piston rod, a spring bearing at opposite ends upon said abutment and said cap, a piston carried by said rod and having a limited movement longitudinally thereof, and a spring normally holding said piston against said abutment, said piston rod having a channel therethrough adapted to form a passage from one side of said piston to the other side and closed by said piston when in normal position.

6. A shock absorber comprising a casing provided with a closure cap and adapted to contain a fluid, a piston rod reciprocable therein and passing through an opening in said cap, an abutment or flange on said piston rod, a spring bearing at opposite ends upon said abutment and said cap, a piston carried by said rod and having a limited movement longitudinally thereof, a spring normally holding said piston against said abutment, and means for adjusting the tension of said last-named spring.

7. A shock absorber, comprising a tubular casing adapted to contain a fluid, a hollow piston rod passing through one end wall of said casing and reciprocable therein and normally spring-pressed inwardly and provided with a series of apertures intermediate its ends, a piston carried by said piston rod, and a plunger secured to the other end of the casing and telescoping within the bore of the hollow piston rod.

8. A shock absorber, comprising a tubular casing adapted to contain a fluid, a hollow piston rod passing through one end wall of said casing and reciprocable therein and normally spring-pressed inwardly and provided with a series of apertures intermediate its ends, a piston carried by said piston rod and having a limited range of movement longitudinally thereof, and a hollow plunger secured to the other end of the casing and having a closed end telescoping within the bore of the hollow piston rod, the side wall of said plunger having a slot therein extending upon opposite sides of said piston, and the wall of the hollow piston rod having an aperture therein registering with said slot, said piston closing said aperture when in normal position.

9. A shock absorber, comprising a tubular casing adapted to contain a fluid, a hollow piston rod passing through one end wall of the casing and reciprocable therein, said rod being provided with an abutment or flange, a spring bearing at opposite ends against said end wall and said abutment, a piston provided with apertures and slidably mounted upon said rod, means normally holding said piston in yielding engagement with said abutment, and a hollow plunger secured to the other end of the casing and having a closed end telescoping within the bore of the inner end of said hollow piston rod and provided with a slot in its side wall extending upon opposite sides of the piston, said hollow piston rod having a graduated opening in alinement with said slot, said piston having a central flange or boss covering said graduated opening when in normal position.

10. A shock absorber, comprising a casing adapted to contain a liquid, a hollow piston rod reciprocable within said casing, a spring coöperating said rod to receive the thrusts imparted thereto, a piston carried by said rod and having a limited movement longitudinally thereof, and means for yieldingly positioning said piston at one end of its range of movement, said piston rod having a channel connecting the chamber of said casing upon opposite sides of said piston and closed by the piston when in normal position.

11. A shock absorber, comprising a casing adapted to contain a liquid, a hollow piston rod having a closed outer end passing through one end wall of said casing and reciprocable within said casing, a plunger secured to the other end of the casing and telescoping within the bore of the hollow piston rod, a spring coöperating said rod to receive the thrusts imparted thereto, means for retarding or cushioning the movement of said rod upon the recoil of said spring, and means for automatically varying the resistance of said retarding means.

12. A shock absorber, comprising a tubular casing adapted to contain a fluid, a hollow piston rod passing through one end wall of said casing and reciprocable therein and normally spring-pressed inwardly and provided with a series of apertures intermediate its ends, a piston carried by said piston rod and provided with a plurality of apertures, and a plunger secured to the other end of the casing and telescoping within the bore of the hollow piston rod.

In testimony whereof I affix my signature in presence of two witnesses.

EMILE WERY.

Witnesses:
ERNEST MILLINGTON,
F. F. SHARPE.